United States Patent [19]

Tsuchiya et al.

[11] 4,205,145
[45] May 27, 1980

[54] RESINS FOR PRINTING INKS

[75] Inventors: Shozo Tsuchiya, Tokyo; Akio Oshima; Hideo Hayashi, both of Yokohama, all of Japan

[73] Assignee: Nippon Oil Co., Ltd., Tokyo, Japan

[21] Appl. No.: 887,280

[22] Filed: Mar. 16, 1978

[30] Foreign Application Priority Data

Mar. 25, 1977 [JP] Japan ................................. 52-32045

[51] Int. Cl.$^2$ ..................... C08F 283/00; C08L 61/06; C08L 61/10
[52] U.S. Cl. ............................ 525/502; 260/DIG. 38
[58] Field of Search ........ 260/845, 846, 848, DIG. 38

[56] References Cited

U.S. PATENT DOCUMENTS

| | | | |
|---|---|---|---|
| 2,521,359 | 9/1950 | Garber | 260/848 |
| 2,778,806 | 1/1957 | Hutchinson | 260/845 |
| 3,083,174 | 3/1963 | Fefer et al. | 260/848 |
| 3,887,641 | 6/1975 | Tsuchiya et al. | 260/848 |
| 3,969,321 | 7/1976 | Kako et al. | 260/845 |
| 4,028,291 | 6/1977 | Tsuchiya et al. | 260/DIG. 38 |
| 4,085,085 | 4/1978 | Tsuchiya et al. | 260/845 |

*Primary Examiner*—Allan Lieberman
*Attorney, Agent, or Firm*—Frank J. Jordan

[57] ABSTRACT

A resin for printing inks, prepared by the reaction of (A) a conjugated double bond-containing five-membered cyclic compound such as dicyclopentadiene, (B) a phenolic compound such as phenol, (C) an unsaturated carboxylic acid such as maleic anhydride and (D) a resol-type phenol resin obtained from phenol or an alkyl-substituted phenol and formaldehyde. In one embodiment, this invention relates to a process for the preparation of said resin for printing inks.

8 Claims, No Drawings

RESINS FOR PRINTING INKS

This invention relates to a novel modified resin having a high melting point for use in printing inks and more particularly to a resin for use in printing inks, prepared by reacting together cyclopentadiene, dicyclopentadiene or an alkyl and/or halogen derivative thereof, a phenolic compound, an unsaturated carboxylic acid and a resol-type phenol resin.

Rosin, alkylphenol resins, rosin-modified phenol resins, maleic resins, modified petroleum resins and other natural or synthetic thermoplastic resins having polar groups have heretofore been used as a surface coating material, tackifier, filler or the like for paints, printing inks or the like, and they have their individual characteristics.

The resins of the present invention are novel ones which are quite different from the heretofore used resins.

A primary object of the present invention is to provide novel resins for use as a surface coating material, tackifier, filler or the like for paints, printing inks or the like, particularly for use as a resin for printing ink and more particularly for use as a resin for offset printing inks.

Today, as varnishes for printing inks, there are used, in many cases, resin varnishes prepared by dissolving an alkylphenol resin, rosin-modified phenol resin, maleic resin or the like in a drying oil such as linseed oil; among these resins, the rosin-modified phenol resin is used in the most cases. Vehicles for printing inks, consisting of a rosin-modified phenol resin, a solvent therefor and/or a drying oil, are superior in quality, however, they are disadvantageous in that rosin is expensive and not necessarily obtainable in any desired amounts since it is a naturally occurring material.

On the other hand, so-called petroleum resins produced by polymerization of cracked oil fractions obtained as by-products in large quantities from the petroleum or petrochemical industry, are advantageous in that they are always available in any desired amounts and at a reasonable cost; however, they are not satisfactory in the respect of quality and there are now hardly obtained therefrom resins which are very useful as a resin for printing inks.

The fundamental properties required in printing inks, particularly offset printing inks, are as follows:

(1) The printing inks should have suitable fluidity characteristics expressed in terms of viscosity and yield value.

(2) They should keep therein the interfacial balance between the water-retaining portions and ink-attached portions thereby allowing the water and ink to contact with each other and together form a clear printing thereof on a plane.

(3) They should be satisfactory in pigment dispersibility.

(4) When printed on a substrate, they should give satisfactory glossy and uniform prints.

(5) They should be set and dried rapidly without causing blocking.

(6) When they are printed, the prints obtained should be satisfactory in friction resistance.

In order to produce printing inks, particularly offset printing inks, having the aforesaid required properties, resins to be used in the inks should meet the following requirements:

(1) The resins should have a high softening point, but they should not be of high molecular weight.

(2) They should contain polar groups which are capable of dispersing pigments and compatible or wettable with the pigments in the inks.

(3) They should have satisfactory solubility in high boiling hydrocarbon solvents containing low aromatic compounds, the solvents being used in the offset printing inks.

(4) They should be satisfactorily soluble in a drying oil such as linseed oil.

Another object of this invention is to provide novel resins as less expensive vehicles which may be substituted for rosin-modified phenol resins as vehicles, the novel resins having the aforesaid various properties required as vehicles for printing inks, particularly offset printing inks and being prepared from the starting materials obtained in large quantities from petroleum or petrochemical industry.

The resins of the present invention are obtained by reacting an unsaturated five-membered cyclic compound having conjugated double bonds or its Diels-Alder reaction product with a phenolic compound, unsaturated carboxylic acid and resol-type phenol resin simultaneously or separtely.

It has heretofore been known that dicyclopentadiene is thermally polymerized at a high temperature of 250°–350° C. in the presence of an inert hydrocarbon solvent such as benzene, toluene, xylene or isooctane to produce a resin which is soluble in a hydrocarbon solvent such as benzene, toluene, xylene, cyclohexane or isooctane (U.S. Pat. No. 3,084,147 for example).

The known dicyclopentadiene resin so produced is soluble in a hydrocarbon solvent such as benzene, toluene, xylene, solvent naphtha or Solvent No. 5 (produced by Nippon Oil Co., Ltd.), however, this dicyclopentadiene resin is unsatisfactory in miscibility with, and adhesion to, various materials because of having no polar groups and is therefore unsuitable for effective use in various applications. If the dicyclopentadiene resin be incorporated with various pigments and solvents to form an ink, then the resin would not satisfactorily be compatible with the pigment and the thus formed ink when printed on a substrate would not give glossy and uniform prints with unsatifactory adhesion of the ink to the substrate, thereby rendering it unsuitable to use the resin as such for offset printing inks.

In an attempt to eliminate the aforesaid drawbacks of the dicyclopentadiene resin, several methods have heretofore been proposed as illustrated hereunder.

There was proposed a method comprising addition reacting the dicyclopentadiene resin with an acrylic acid ester, maleic anhydride or the like, hydrolyzing the resulting adduct to produce a carboxylic acid-containing resin and then reacting the thus produced resin with a polyhydric alcohol and higher fatty acid to obtain a resin for printing inks (Japanese Patent Application Laying-Open Gazette No. 24405/72). In order that an offset printing ink containing the resin as the coating material may set and dry in substantially the same time as a conventional ink during printing, the resin should have a high softening point. However, the resin having a high softening point decreases in solubility in petroleum-derived hydrocarbon solvents for offset printing inks and, therefore, the ink decreases in fluidity simultaneously with a remarkable decrease in gloss. In addition, when the resin is used in the preparation of a varnish, it will cause gel formation and turbidity thereby aggravating the color tone of the resulting varnish. On the other hand, in order that the resin may be dissolved satisfactorily in solvents for inks, it should have a low softening point and therefore takes a longer time to set and dry thus rendering it unsuitable for practical use.

There was also proposed another method comprising thermally polymerizing cyclopentadiene and maleic anhydride to obtain a resin (U.S. Pat. No. 2,608,550). If the amount of maleic anhydride used is small when the resulting resin will usually have an unduly high softening point as well as poor pigment dispersibility and miscibility with other fillers, while if that of maleic anhydride used is large then the resulting resin will have poor weather-proofing property and tend to cause coloration and gel formation thereof. In addition, the aforesaid U.S. Patent discloses that a resin for inks may be produced according to the so-called alkyd formulation, more particularly produced by thermally polymerizing dicyclopentadiene and maleic anhydride to produce a resin as the polybasic acid component and then reacting the thus produced polybasic acid component with a polyhydric alcohol and drying oil; however, the alkyd resins so produced generally have a high molecular weight and poor solubility in drying oils and high boiling hydrocarbon solvents for inks, and, when used in the preparation of inks, the resulting inks will have unsatisfactory fluidity, give prints with poor gloss if printed and cause remarkable misting thereby making them unsuitable for practical use.

In order to provide a resin eliminating these drawbacks of the known resins for inks, the present inventors already disclosed a process for the preparation of such a resin characterized by addition reacting with an unsaturated carboxylic acid a resin prepared by the thermal polymerization of a five-membered cyclic compound having conjugated double bonds and a Diels-Alder reaction product thereof and then reacting the resulting acid-modified resin with a resol-type phenol resin (Japanese Patent Application Laying-Open Gazette No. 82405/74 and U.S. Pat. No. 3,887,641). However, offset printing inks prepared using the final resin obtained by the aforesaid published process are still somewhat unsatisfactory in their setting speed and gloss of prints obtained by printing them on a substrate.

The resins of the present invention are those eliminating these disadvantages and may be obtained by simultaneously or successively reacting:

(A) a five-membered cyclic compound having conjugated double bonds or a Diels-Alder reaction product thereof, with (B) a phenolic compound, (C) an unsaturated carboxylic compound and (D) a resol-type phenol resin.

These starting materials (A) to (D) will be explained in detail hereinbelow.

The five-membered cyclic compound or its Diels-Alder reaction product (A) as the first starting material is represented by the following general formula

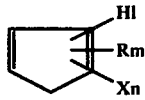

wherein R is an organic residue (or radical) having 1 to 24 carbon atoms, X is a halogen atom, and l, m and n are each an integer of from 0 to 6 with the proviso that the total of l, m and n is 6.

The symbol "R" used herein indicates an organic residue having 1 to 24 carbon atoms and includes an aliphatic, alicyclic, aromatic or like hydrocarbon residue as well as a hydrocarbon residue into which is introduced a hetero atom such as oxygen, nitrogen or sulphur if the substituents so introduced do not cause any inconvenient reactions with the other starting materials used in this invention. X indicates a halogen atom such as fluorine, chlorine or bromine. The symbols "l, m, n" are each an integer of from 0 to 6 with the proviso that the total thereof is 6. In the case that m and n are each more than 1, R and X may be identical with, or different from, each other.

In this invention, the Diels-Alder reaction products of said five-membered cyclic compound (A) may also be used as the starting material (A). The preferable starting materials (A) are the five-membered cyclic compounds of said formula wherein R is an alkyl group having 1 to 6 carbon atoms, m is 0 to 2 and n is zero, the Diels-Alder reaction products thereof, and mixtures of these compounds and products.

Typical of the preferable starting materials (A) for industrial use are cyclopentadiene, monochlorocyclopentadiene, methylcyclopentadiene, dicyclopentadiene, cyclopentadiene-methylcyclopentadiene codimer, tricyclopentadiene and mixtures thereof.

It is not necessarily required that the cyclopentadiene, dicyclopentadiene or alkyl-substituted derivatives thereof be highly pure, however, it is preferred that the material (A) contain not less than 80% by weight of cyclopentadiene, dicyclopentadiene or alkyl-substituted derivatives thereof. For example, as the material (A), there may be used a concentrated fraction obtained by thermally dimerizing cyclopentadiene and methylcyclopentadiene each contained in a $C_5$ fraction obtained as a by-product oil at the time of pyrolysis of naphtha or the like at a high temperature to produce dicyclopentadiene, dimethylcyclopentadiene, cyclopentadiene-methylcyclopentadiene codimer, cyclopentadiene-isoprene codimer, cyclopentadiene-piperylene codimer and the like in mixture and then distilling the thus produced mixture to remove therefrom the greater part of the $C_5$ olefins, $C_5$ paraffins and other $C_5$ components thereby obtaining the concentrated fraction.

To adjust the softening point, solubility and the like of a resin to be obtained, the starting material (A) may be used in admixture with an aromatic compound having at least one reactive double bond such as styrene, vinyltoluene, α-methylstyrene, indene or methylindene. In this case, it is preferable that these aromatic compounds be used in an amount of up to 50% by weight of the five-membered cyclic compound or Diels-Alder reaction product thereof as the original material (A).

The starting materials (B) which are phenolic compounds, include alkyl-substituted phenols such as phenol, cresol, ethylphenol, isopropylphenyl, tert.-butylphenol, tert.-octylphenol and nonylphenol and also include catechol, resorcine, bisphenol A and mixtures thereof.

The starting materials (C) which are unsaturated monocarboxylic and polycarboxylic acids and anhydrides thereof each having usually 3-32 carbon atoms, include acrylic acid, methacrylic acid, maleic acid, maleic anhydride, tetrahydrophthalic acid and anhydride thereof, fumaric acid, citraconic acid, itaconic acid and mixtures thereof.

The starting materials (D) which are resol-type phenol resins, are obtained by reacting phenol or an alkyl-substituted phenol with formaldehyde (used as formalin) in the presence of a basic catalyst. The alkyl-substituted phenols used herein include cresol, ethylphenol, isopropylphenol, tert.-butylphenol, tert.-octylphenol and nonylphenol.

The starting materials (A) to (D) may be mixed together at the same time for reaction or may be mixed successively for reaction. In the latter case, for example, the materials (A) is reacted with the material (B) to produce a resin which is addition reacted with the material (C) and then reacted with (D); the materials (A), (B) and (C) are reacted together to obtain a reaction product which is then with the material (D); or the materials (A), (B) and (D) are reacted together and the resulting reaction product is then reacted with the material (C).

In order to obtain a particular resin useful especially for offset printing inks, the resin prepared from the materials (A) to (D) may, if necessary, be further reacted with a small amount of a monohydric or polyhydric alcohol at an elevated temperature thereby adjusting the softening point, molecular weight and the like of the resulting particular resin. In this case, half esters of a natural fatty acid and polyhydric alcohol, such as fatty acid-pentaerithritol diesters and rosin acid-pentaerithritol diesters, may also be used. The resin prepared from the materials (A) to (D) may be reacted with said alcohol and/or half esters or the materials (A) to (C) may be reacted therewith prior to reaction with the material (D).

The resin of this invention may be obtained by reacting together the four materials (A) to (D) in the various orders or manners as mentioned above.

Firstly, there will be detailed hereunder the case in which the materials (A) to (D) are reacted with each other in that order.

It is the most remarkable feature of this invention to use the phenolic compounds as the second material (B) thereby eliminating the drawbacks of the conventional resins. Thus, the amount of the material (B) used is of importance. More particularly, the ratio by weight of the conjugated double bond-containing five-membered cyclic compound or Diels-Alder reaction product thereof (A) to the phenolic compound (B) is in the range between 60:40 and 95:5 (that is, $60/40 \leq (A)/(B) \leq 95/5$), preferably 70:30 and 90:10 (that is, $70/30 \leq (A)/(B) \leq 90/10$). The use of the material (B) in amounts exceeding the upper limit of said range will result in the production of a final resin having decreased solubility in aliphatic hydrocarbons, while the use thereof in amounts below the lower limit of said range will result in the production of a final resin such that inks containing the final resin produce prints having decreased gloss when printed.

Firstly, a mixture of the materials (A) and (B) in the specified ratio is reacted in the presence or absence of a solvent. The solvent is not specifically limited and may be an inert one which does not cause an inconvenient reaction with the materials (A) and (B). The preferable solvents are inert solvents such as hydrocarbon solvents and halogenated hydrocarbon solvents and are illustrated by benzene, toluene, xylene, hexane, heptane, isooctane and chlorobenzene.

The reaction between the materials is effected under such conditions that they are polymerized and is effected in the absence of catalysts or in the presence of a radical initiator or a cationic polymerization catalyst such as a Friedel-Crafts type catalyst. The polymerizing reaction in the absence of catalysts or in the presence of a radical initiator may be effected at 150°–330° C., preferably 240°–300° C., for 10 minutes to 20 hours, and, after the reaction, the solvent, the unreacted material, and low polymers produced are removed by distillation-off. The polymerizing reaction in the presence of a Friedel-Crafts type catalyst such as boron trifluoride, aluminum chloride, boron trifluoride etherate and boron trifluoride phenolate, is effected at −30° to 60° C. for 10 minutes to 15 hours, the catalyst being used in an amount of 0.01–5% by weight of the polymerizable material (A), after which the reaction mixture is separated from the catalyst with an alkaline compound such as sodium hydroxide or sodium carbonate, washed with water if necessary, and then distilled to remove therefrom the solvent, the unreacted material, and low polymers produced.

According to this invention, it is possible to adjust the molecular weight and softening point of resins to be obtained from the materials (A) and (B), by selecting the monomer ((A) and (B)) concentrations, reaction temperature and reaction time used; it is preferable that the resins have a softening point of 80° C. or higher. Resins having a high softening point such as 200° C. or higher, may be produced by the process according to this invention, however, they are disadvantageous in that they are less soluble in solvents for inks such as hydrocarbon solvents and linseed oil and, in some cases, they are partly insoluble in such solvents.

The copolymer resin (I) obtained from the conjugated double bond-containing five-membered cyclic compound or Diels-Alder reaction product thereof (A) and a phenolic compound (B) as previously mentioned, is then addition reacted with the unsaturated carboxylic acid (C) to obtain an acid-modified resin (II). In this addition reaction, the unsaturated carboxylic acid (C) may be used in amounts of 2–20 parts, preferably 5–15 parts, by weight per 100 parts by weight of the copolymer resin (I). The use of the unsaturated carboxylic acid (C) in an amount of more than 20 parts by weight will result in the production of an acid-modifier resin having an undesirable decreased solubility in aliphatic hydrocarbon solvents, while the use thereof in an amount of less than 2 parts by weight will result in the production of an acid-modified resin with which the resol-type phenol resin (D) does not satisfactorily react. The addition reaction of the unsaturated carboxylic acid (C) with the copolymer resin (I) is effected by mixing the acid (C) and resin (I) together and reacting the resulting mixture at a preferable temperature of 150°–250° C. for a preferable time period of 0.5–7 hours.

The acid-modified resin (II) may be prepared by reacting a mixture of the materials (A), (B), (C) and, if necessary, a small amount of a monohydric or polyhydric alcohol at 150°–330° C. The term "acid-modified resin (II)" used herein is intended to include the acid-modified resin (II) and its half esters so obtained.

The acid-modifier resin (II) is further reacted with a resol-type phenol resin (D) at 160°–300° C. for 0.5 to 15 hours to obtain a final resin of this invention. The material (D) is used in an amount of 5–40 parts, preferably 10–30 parts, by weight per 100 parts by weight of the resin (II). The use of more than 40 parts by weight of the material (D) will result in the production of a final resin having decreased solubility in aliphatic hydrocarbons, while the use of less than 5 parts by weight thereof will result in the production of a final resin such that the resulting ink containing the final resin does not have satisfactory fluidity and the like nor does it give prints having satisfactory gloss when printed.

The resins of this invention useful for inks, particularly offset printing inks, should preferably have a softening point of 100°–160° C. If a final resin having a softening point of lower than 80° C. is used in the preparation of a printing ink, then the resulting printing ink will be undesirable in that it causes much misting, remarkably decreases in drying velocity and is apt to cause blocking.

The resins of this invention have polar groups and unsaturated bonds and are used as a surface coating material, tackifier, filler or the like for paints or inks; they may be used particularly for printing inks such as gravure and offset printing inks and they are suitable particularly for offset printing inks.

They may be blended with a drying oil, semidrying oil, solvent or the like to form a varnish when they are to be used in the preparation of particularly offset, gravure and like printing inks. In addition, since they have polar groups and unsaturated bonds, they are (i) hydrogenated or (ii) they are reacted with a polyhydric alcohol alone or with a mixture of an polyhydric alcohol, fatty acid and/or oil to produce a half ester or so-called alkyd resin which may also be used in the preparation of printing inks as mentioned above.

Secondly, the reaction of at least three of the materials (A) to (D) at the same time will be detailed hereinbelow.

In a case where the materials (A), (B) and (C) are reacted together and then reacted with the material (D), the materials (A), (B) and (C) are mixed together in the aforesaid ratios by weight and reacted at 150°–330° C. for 10 minutes–20 hours to form an acid-modified resin which is then reacted with the material (D) in the ratios by weight at the elevated temperatures as previously mentioned thereby obtaining the desired final resin for inks.

In another case where the materials (A), (B), (C) and (D) are reacted at the same time, the materials are mixed in the ratios by weight and reacted at 150°–330° C. for 10 minutes–20 hours as previously mentioned thereby obtaining the desired final resin.

The features of the final resins of this invention and the featured applicability thereof to inks are illustrated as follows.

(1) The final resins of this invention are very industrially advantageous in that they may directly be used in the preparation of a varnish without employing the so-called alkyd formulation usually necessary for such final resins in the production of resins for offset printing inks.

(2) They may be used alone as a novel resin for various printing inks such as offset printing inks and they when used in inks will exhibit the same or excellent printing effects and printability as compared with the conventionally used rosin-modified phenol resins, alkylphenol resins and the like. In addition, they may be obtained at a lower cost than the rosin-modified phenol resins.

(3) No new equipment is required for the production of inks using the final resin of this invention since said final resin may be used in the same procedure as the conventionally used resins thereby to produce offset printing inks. For example, 100 parts by weight of the resin of this invention are so dissolved in a mixture of 0–150 parts by weight of an oil such as a drying oil and 0–100 parts by weight of a petroleum-derived solvent at an ambient or elevated temperature as to obtain a varnish having a viscosity of 300–500 poise at an ambient temperature, and the varnish so obtained is incorporated with pigments and the like and then kneaded thereby to obtain an offset printing ink.

(4) The final resins of this invention may be used in combination with the conventional resins.

(5) They will permit any pigments to display their inherent color tone when incorporated with the pigments and perform their coloration of the resulting ink since they are those obtained with a light color.

(6) They may be used not only as a resin for offset printing inks but also as a resin for gravure printing inks.

This invention will be better understood by the following non-limitative examples.

EXAMPLE 1

Four hundred and fifty (450) grams of dicyclopentadiene (DCPD) of 97% purity and 200 g of commercially available nonylphenol were charged into an autoclave provided with an agitator, and the resulting mixture was reacted at 260° C. for 2.5 hours. After the reaction, the autoclave was cooled and the contents (reaction mixture) were distilled to remove therefrom the unreacted materials and low polymers thereby obtaining 552 g of a resin (I-A) having a softening point of 135.0° C.

One hundred (100) grams of the resin (I-A) were melted, incorporated with 7 g of maleic anhydride, after which the resulting mixture was heated to 210° C. for 2 hours, incorporated with 20 g of a commercially available resol-type phenol resin (supplied under the trademark of HITANOL 2501 produced by Hitachi Kasei Kogyo Co., Ltd.) and reacted at 220° C. for one hour thereby to obtain a resin (I-B) having a softening point of 170° C. and an acid value of 20.0.

EXAMPLE 2

One thousand and five hundred (1500) grams of p-tert.-butylphenol were melted, incorporated with 300 g of a 30% aqueous solution of sodium hydroxide and 1400 g of formalin (37% HCHO), reacted together at 60° C. for 7 hours, neutralized with hydrochloric acid and then washed with water to obtain 1600 g of a resol-type phenol resin.

Then, 550 g of DCPD of 96% purity, 200 g of p-tert.-octylphenol and 300 g of commercially available mixed xylene were introduced into an autoclave provided with an agitator, and the resulting mixture was reacted at 260° C. for 4 hours. After the reaction, the procedure of Example 1 was repeated thereby obtaining 607 g of a resin (II-A) having a softening point of 132.0° C. One hundred (100) grams of the resin (II-A) were melted, incorporated with 6 g of maleic anhydride, heated to 210° C. under agitation for 2 hours, incorporated with 20 g of said resol-type phenol resin and then reacted together at 220° C. for 2 hours thereby to obtain a resin (II-B) having a softening point of 175.5° C. and an acid value of 25.

EXAMPLE 3

A three-necked flask was charged with 100 g of DCPD of 97% purity, 15 g of p-tert.-butylphenol and 180 g of toluene to form a mixture which was reacted at 0° C. for 3 hours in the presence of 1.8 g of boron trifluoride phenolate as the catalyst thereby to form a reaction mixture.

After the reaction, the reaction mixture so obtained was treated with an aqueous solution of sodium hydroxide to remove the catalyst therefrom, washed with water and then distilled to remove therefrom the solvent, unreacted materials and low polymers thereby obtaining 126 g of a resin (III-A) having a softening point of 135° C.

One hundred (100) grams of the resin (III-A) were melted, incorporated with 8 g of maleic anhydride, agitated at 200° C. for 4 hours, incorporated with 15 g of the resol-type phenol resin obtained in Example 2 and then reacted at 230° C. for 2 hours to obtain a resin (III-B) having a softening point of 165.0° C. and an acid value of 20.

EXAMPLE 4

A cracked oil fraction (boiling at 28°–60° C.) produced as a by-product at the time of producing ethylene, propylene and the like by the steam cracking of naphtha, was heated to 120° C. for 4 hours and then distilled to remove the $C_5$ fraction therefrom thereby to obtain a fraction containing 85% of DCPD with the balance including codimer of cyclopentadiene and isoprene or piperylene.

Four hundred (400) grams of the thus obtained fraction containing 85% DCPD and 80 g of phenol were charged into an autoclave provided with an agitator, and the resulting mixture was reacted at 250° C. for 3 hours and then treated in the same manner as in Example 1 thereby to obtain 336 g of a resin (IV-A) having a softening point of 140° C.

One hundred (100) grams of the resin (IV-A) were melted, incorporated with 7 g of maleic anhydride, agitated at 220° C. for 2 hours, incorporated with 20 g of the resol-type phenol resin obtained in Example 2 and then reacted at 220° C. for 2 hours to obtain a resin (IV-B) having a softening point of 171.0° C. and an acid value of 18.

Comparative example 1

Two hundred and seventy-five (275) grams of DCPD of 96% purity and 120 g of commercially available mixed xylene were charged into an autoclave provided with an agitator, and the resulting mixture was reacted at 260° C. for 2.5 hours and then distilled to remove the unreacted materials and low polymers therefrom thereby obtaining a resin (VII-A) having a softening point of 123.0° C.

One hundred (100) grams of the resin (VII-A) so obtained were melted, incorporated with 7 g of maleic anhydride, agitated at 220° C. for 2 hours, incorporated with 20 g of a commercially available resol-type phenol resin (supplied under the trademark of HITANOL 2501 produced by Hitachi Kasei Kogyo Co., Ltd.) and agitated at 220° C. for 2 hours thereby to obtain a resin (VII-B) having a softening point of 165° C. and an acid value of 21.

Comparative example 2

One hundred (100) grams of the resin (I-A) obtained in Example 1 were melted, incorporated with maleic anhydride and agitated at 210° C. for 2 hours to obtain a resin (VIII) having a softening point of 155° C. and an acid value of 36.

Comparative example 3

One hundred (100) grams of the resin (I-A) obtained in Example 1 were melted, incorporated with 20 g of a commercially available resol-type phenol resin (supplied under the trademark of HITANOL 2501 by Hitachi Kasei Kogyo Co., Ltd.) and then agitated at 220° C. for 2 hours thereby obtaining a resin (IX) having a softening point of 145° C. and an acid value of zero.

EXAMPLE 5

Five hundred and twenty-eight (528) grams of DCPD of 95% purity, 108 g of p-cresol and 70 g of maleic anhydride were charged into an autoclave provided with an agitator, and the resulting mixture was reacted at 270° C. for 6 hours and then distilled to remove the unreacted materials and low polymers thereby to obtain 635 g of a resin (V-A) having a softening point of 135.0° C. and an acid value of 38.0.

One hundred (100) grams of the resin (V-A) so obtained were melted, incorporated with 25 g of a resol-type phenol resin (supplied under the trademark of HITANOL 2501 by Hitachi Kasei Kogyo Co., Ltd.) and reacted under agitation at 220° C. for one hour to obtain a resin (V-B) having a softening point of 178° C. and an acid value of 36.0.

EXAMPLE 6

Six hundred and sixty (660) grams of DCPD of 96% purity, 56 g of maleic anhydride and 90 g of the same resol-type phenol resin as used in Example 2 were charged into an autoclave provided with an agitator, the resulting mixture was reacted at 250° C. for 8 hours and then distilled to remove the unreacted materials and low polymers thereby to obtain 742 g of a resin (VI) having a softening point of 155° C. and an acid value of 26.0.

Offset printing inks and gravure printing inks were prepared using the final resins of Examples 1–6 and Comparative examples 1–3, respectively, and the printing inks so prepared were tested for ink properties.

(A) Preparation and test of offset printing inks (Preparation of varnishes)

One hundred (100) grams of the final resin were incorporated with 70 g of linseed oil to form a mixture which was heated to 230° C. for 2 hours, incorporated with 40 g of a petroleum-derived hydrocarbon solvent (specific gravity 0.85, aniline point 72.8, initial distillation point 272° C., final point 308° C.) and thoroughly blended to obtain a varnish.

(Preparation of inks)

The following ingredients were kneaded together by using a three-roll kneader. The amount of the petroleum-derived hydrocarbon solvent used was so adjusted that the SR value of the resulting ink was in the range of 17–18.

| | |
|---|---|
| Carmin 6B | 18 g |
| Varnish | 67 g |
| Solvent | 5–10 g |
| Friction resistance improver (Wax compound) | 3 g |
| Drier for inks (Co drier) | 2 g |

(Performance test and result)

Gloss:

The ink (0.4 cc) was spread on art paper by the use of an RI tester (tester for printability), allowed to stand for 24 hours and then tested with a 60°-60° gloss (or luster) meter.

Time to set:

The ink (0.4 cc) was spread on art paper by the use of an RI tester, after which art paper was laid on said ink-spread art paper to see to what extent the thus-spread ink was transferred from the latter to the former with the lapse of time by the use of the RI tester roller, thus finding the time in which no transfer of the spread ink was effected.

Misting:

The ink (2.4 cc) was placed on an ink-o-meter and rotated at a speed of 1200 rpm for 3 minutes to see to what extent the ink so placed was scattered onto art paper placed below the roller.

Time to dry:

The ink (0.4 cc) was spread on art paper by the use of the RI tester and then tested for its drying time by using an ink drying tester.

The result is shown in the following Table.

pared were satisfactory in viscosity stability. When they were printed, the prints dried more rapidly than gravure printing inks wherein limed rosin was used. In addition, they exhibited very satisfactory printing effects and were found to be well usable as a process ink for multi-color printing.

What is claimed is:

1. A process for the preparation of a resin for printing inks, comprising the steps of:

reacting (A) a conjugated double bond-containing five-membered cyclic compound represented by the following formula

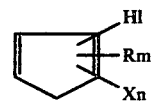

wherein H is hydrogen, R is an organic residue having 1-24 carbon atoms, X is halogen, and l, m and n are each an integer of 0-6 with the total thereof being 6, or a Diels-Alder reaction product thereof, with (B) a phenolic compound in a ratio by

|  | Resin used | Viscosity of varnish (poise, 25° C.) | Appearance of varnish | Gloss | Time to set (min.) | Time to dry (hr) | Misting |
|---|---|---|---|---|---|---|---|
| Example 1 | I - B | 370 | Transparent | 65 | 10 | 6.0 | None |
| Example 2 | II - B | 390 | " | 63 | 11 | 5.5 | " |
| Example 3 | III - B | 350 | " | 62 | 10 | 6.5 | " |
| Example 4 | IV - B | 400 | " | 62 | 10 | 6.0 | " |
| Example 5 | V - B | 305 | " | 64 | 10 | 6.0 | " |
| Example 6 | VI | 300 | " | 66 | 15 | 6.0 | " |
| Comparative example 1 | VII - B | 380 | Somewhat non-transparent | 48 | 17 | 6.5 | " |
| Comparative example 2 | VIII | 350 | Insoluble matter left and, therefore, no inks produced. | | | | |
| Comparative example 3 | IX | 330 | Turbid | 35 | 25 | 8.0 | Some |
| Control resin | Commercially* available rosin-modified phenol resin | 410 | Transparent | 58 | 15 | 5.5 | None |

* The rosin-modified phenol resin was one produced under the trademark of BECCASITE 1126 by Dai Nippon Ink Chemical Industry Co., Ltd.

(B) Preparation and test of gravure printing inks (Test 1)

The resin (I-B) obtained in Example 1 was so dissolved in toluene as to produce a solution or varnish having a viscosity of 40 centipoise. This varnish had a concentration of 45% by weight.

Portions of the varnish were incorporated with Carmin 6B, phthalocyanine blue, Benzidine Yellow, and carbon black together with a toluene solution of gilsonite to obtain a red ink, blue ink, yellow ink and black ink, respectively. Each of the inks so obtained increased in viscosity by 10% after the lapse of one week from the time at which it had just been produced, this proving that the inks are all stable in viscosity. When the inks were printed, the prints exhibited the same drying velocity as compared with gravure printing inks in which limed rosin was used, and they also exhibited more satisfactory gloss and uniformity than said gravure printing inks.

(Test 2)

The resin (III-B) obtained in Example 3 was used in the preparation of gravure printing inks in accordance with the procedure of said Test 1, and the inks so preweight of from 60:40 to 95:5 in the absence or presence of a catalyst at 150°-330° C. for 10 minutes-20 hours to produce a resin, addition reacting the thus produced resin with (C) an unsaturated carboxylic acid in an amount by weight of 2-20 parts per 100 parts by weight of the resin at 150°-250° C. for 30 minutes-7 hours to produce an acid-modified resin and then reacting the thus produced acid-modified resin with (D) a resol-type phenol resin in an amount by weight of 5-40 parts per 100 parts by weight of the acid-modified resin at 160°-300° C. for 30 minutes-15 hours, the resol-type phenol resin (D) being obtained by reacting with formaldehyde in the presence of a basic catalyst phenol or an alkyl-substituted phenol selected from the group consisting of cresol, ethylphenol, isopropylphenol, tert.-butylphenol, tert.-octylphenol and nonylphenol, thereby to prepare the resin for printing inks.

2. A process for the preparation of a resin for printing inks, comprising the steps of:

reacting (A) a conjugated double bond-containing five-membered cyclic compound represented by the following formula

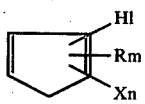

wherein H is hydrogen, R is an organic residue having 1-24 carbon atoms, X is halogen, and l, m and n are each an integer of 0-6 with the total thereof being 6, or a Diels-Alder reaction product thereof, with (B) a phenolic compound in a ratio by weight of from 60:40 to 95:5 in the presence of a Friedel-Crafts type catalyst at −30° to 60° C. for 10 minutes-20 hours to produce a resin, addition reacting the thus produced resin with (C) an unsaturated carboxylic acid in an amount by weight of 2-20 parts per 100 parts by weight of the resin at 150°-250° C. for 30 minutes-7 hours to produce an acid-modified resin and then reacting the thus produced acid-modified resin with (D) a resol-type phenol resin in an amount by weight of 5-40 parts per 100 parts by weight of the acid-modified resin at 160°-300° C. for 30 minutes-15 hours, the resol-type phenol resin (D) being obtained by reacting with formaldehyde in the presence of a basic catalyst phenol or an alkyl-substituted phenol selected from the group consisting of cresol, ethylphenol, isopropylphenol, tert.-butylphenol, tert.-octylphenol and nonylphenol, thereby to prepare the resin for printing inks.

3. A process for the preparation of a resin for printing inks, comprising the steps of:

reacting (A) a conjugated double bond-containing five-membered cyclic compound represented by the following formula

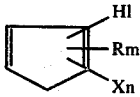

wherein H is hydrogen, R is an organic residue having 1-24 carbon atoms, X is halogen, and l, m and n are each an integer of 0 to 6 with the total thereof being 6, or a Diels-Alder reaction product thereof, with (B) a phenolic compound and (C) an unsaturated carboxylic acid at 150°-330° C. for 10 minutes-20 hours in such amounts that the ratio by weight of the compound (A) to the compound (B) is in the range of from 60:40 to 95:5 and the ratio by weight of the compound (C) to the total of the compounds (A) and (B) is in the range of from 2:100 to 20:100 to produce an acid-modified resin and then reacting the thus produced acid-modified resin with (D) a resol-type phenol resin at 160°-300° C. for 30 minutes-15 hours, the resol-type phenol resin (D) being obtained by reacting with formaldehyde in the presence of a basic catalyst phenol or an alkyl-substituted phenol selected from the group consisting of cresol, ethylphenol, isopropylphenol, tert.-butylphenol, tert.-octylphenol and nonylphenol, thereby to prepare the resin for printing inks.

4. A process for the preparation of a resin for printing inks, comprising the steps of:

reacting (A) a conjugated double bond-containing five-membered cyclic compound represented by the following formula

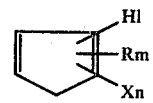

wherein H is hydrogen, R is an organic residue having 1-24 carbon atoms, X is halogen, and l, m and n are each an integer of 0-6 with the total thereof being 6, or a Diels-Alder reaction product thereof, with (B) a phenolic compound, (C) an unsaturated carboxylic acid and (D) resol-type phenol resin at 150°-330° C. for 10 minutes-20 hours in such amounts that the ratio by weight of the compound (A) to the compound (B) is in the range of from 60:40 to 95:5, the ratio by weight of the compound (C) to the total of the compounds (A) and (B) in the range of from 2:100 to 20:100 and the ratio by weight of the compound (D) to the total of the compounds (A), (B) and (C) in the range of from 5:100 to 40:100, thereby to prepare the resin for printing inks.

5. A resin for printing inks, prepared by the process of claim 1.

6. A resin for printing inks, prepared by the process of claim 2.

7. A resin for printing inks, prepared by the process of claim 3.

8. A resin for printing inks, prepared by the process of claim 4.

* * * * *